(12) United States Patent
Lynch

(10) Patent No.: US 8,509,607 B2
(45) Date of Patent: Aug. 13, 2013

(54) CAMERA HEAD

(76) Inventor: Chris Lynch, Landing, NJ (US)

( * ) Notice: Subject to any disclaimer, the term of this patent is extended or adjusted under 35 U.S.C. 154(b) by 69 days.

(21) Appl. No.: 13/166,379

(22) Filed: Jun. 22, 2011

(65) Prior Publication Data

US 2011/0311211 A1 Dec. 22, 2011

Related U.S. Application Data

(60) Provisional application No. 61/357,282, filed on Jun. 22, 2010.

(51) Int. Cl.
 *G03B 17/08* (2006.01)
(52) U.S. Cl.
 USPC .............................. 396/28; 348/84
(58) Field of Classification Search
 USPC .................. 396/28; 348/82, 84, 85
 See application file for complete search history.

(56) References Cited

U.S. PATENT DOCUMENTS

| | | | |
|---|---|---|---|
| 4,977,418 A * | 12/1990 | Canty | 396/19 |
| 2003/0030745 A1* | 2/2003 | Meek et al. | 348/370 |
| 2008/0151046 A1* | 6/2008 | Scott et al. | 348/82 |
| 2008/0158349 A1* | 7/2008 | Miller et al. | 348/82 |
| 2010/0014172 A1* | 1/2010 | Koyama et al. | 359/739 |
| 2010/0208056 A1* | 8/2010 | Olsson et al. | 348/84 |

* cited by examiner

*Primary Examiner* — Clayton E LaBalle
*Assistant Examiner* — Dennis Hancock
(74) *Attorney, Agent, or Firm* — Saul Ewing LLP; Stephen J. Driscoll

(57) ABSTRACT

A camera head comprising: (a) housing having a front and back orientation and defining a cavity, the housing being cylindrical and having an axis, the housing having a rear portion for interengaging with a support system; (b) a first wall annularly configured in the housing; (c) a front portion in threaded engagement with the housing such that rotating the front portion causes it to move axially with respect to the housing, the front portion having a front face at least a portion of which is transparent, the front portion comprising a second wall being cylindrical and extending backward from the front face to define a center cavity, the first and second walls cooperating to define an annular cavity; (d) at least one lens attached to the second wall and disposed in the center cavity; (e) one or more light emitting devices disposed in the annular cavity and operatively connected to the housing; and (f) at least one imaging device disposed in the cavity operatively connected to the housing and optically coupled to the lens; and wherein when the front portion is rotated relative to the housing, the lens moves with the front portion while the light emitting device remain stationary with respect to the housing.

12 Claims, 2 Drawing Sheets

CAMERA HEAD

REFERENCE TO RELATED APPLICATION

This application claims priority to U.S. Provisional Application No. 61/357,282, filed Jun. 22, 2010, hereby incorporated by reference in its entirety, including its Appendix.

FIELD OF INVENTION

The present invention relates generally to a camera head, and, more specifically, to a self-illuminated camera head used for inspection and monitoring.

BACKGROUND OF INVENTION

Self-illuminated camera heads are ubiquitous, being used in a host of applications ranging from inspection of municipal sewage pipes to endoscopic surgical procedures. Of particular interest herein is pipe inspection, although the invention is not limited to this application. A camera head used for pipe inspection typically comprises an imaging device for converting the image to an electrical signal, a lenses for focusing the image, lighting for adequately illuminating the field of view, a housing to hold the lighting, lenses, and imaging device in a single unit, typically referred to as the head, and a support system for providing the necessary electrical interface and mechanical interconnection to support and position the camera head. Such support systems are known, and include, for example, wand devices, push cameras (e.g., See-snake, SnakeEye III, Pilit, Vi-Vax, and Verisight), and robotic arms.

Although camera heads used in such applications have been commercially available for some time, applicant has identified a number of shortcomings in these devices. For example, adjusting the focus of these devices tends to be problematic. In fact, many such devices have no means of adjusting the focus—the lens and an imaging device are preconfigured in a package such that adjustment of the field of view and the focus is prohibited.

Furthermore, those devices that do provide for adjustable focus tend to be awkward to use. For example, one prior art approach requires using a tool that is inserted in the front of the device to engage the lens, at which point, the lens may be turned one way or the other to adjust its focus. Such an approach, however, is inconvenient for a number of reasons. First, it requires a tool that is likely to lost or not available over the course of the instrument's useful life. Additionally, because the tool is inserted in the front of the camera head, the lens cannot be adjusted while the camera is in use. In other words, the need to approach the imaging head from the front to adjust the lens prevents a user from adjusting the lens in situ because the field of view and the light will necessarily be obscured by the tool and user's hand.

Another prior art approach for adjusting the lens involves a device having a front portion, which contains the lens and the lights and which is capable of being rotated such that the position of the lens changes relative to the imaging device. Although this approach allows for in situ adjustment of the lens (i.e., the user's hand is not in the way of the imaging device), it also is configured such that the lights are rotated with the lens. Such a configuration necessarily requires a relative complex electrical interface to provide power to the lights. In other words, an electrical interface, such as contact pins or slip ring, which allows for movement between components while still maintaining an electrical connection is required between the lights and their power source. Such an interface, however, is complex, and tends not to be as reliable as a static electrical connection because the parts tend to wear out over time, resulting in open/shorted circuits and diminished electrical performance.

Applicant has also identified that prior art camera heads also do not lend themselves to substituting one lens assembly for another to change the field of view. That is, the prior art devices tend to integrally package the lens assembly with the head such that interchanging the lens assembly is difficult, if not impossible, in the field. Therefore, if different fields of view are desired, the user is often forced to purchase different camera heads with different lens assemblies.

What is needed is a camera head having an adjustable lens that requires no tool, avoids the needs for complex electrical interfaces, and facilitates interchangeable lens. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a camera head in which the lens can be adjusted without the need for a tool and without the need for complicated electronic interconnects to facilitate movement among different electronic components. Specifically, the present invention provides a camera head having a housing in which the electrical components are operatively attached, and an adjustable front portion which holds the lens assembly independent of the housing. Any movement of the forward portion thus results in movement of the lens relative to the housing and to the electrical components, such as the imaging device, contained in the housing. Additionally, because the lens is held in this discrete package, it is readily interchangeable with different lens assemblies. Furthermore, in one embodiment, the front portion also serves to segregate the space used to house the lights from the space used to house the imaging device, thus allowing higher output lights to be used without interfering with the imaging device and thus degrading optical performance. Still other benefits will be apparent in the practice of the present invention.

Accordingly, in one embodiment, the camera head comprises: (a) a housing having a front and back orientation and defining a cavity, the housing being cylindrical and having an axis, the housing having a rear portion for interengaging with a support system; (b) a first wall annularly configured in the housing; (c) a front portion in threaded engagement with an outer surface of the housing such that rotating the front portion causes it to move axially with respect to the housing, the front portion having a front face at least a portion of which is transparent, the front portion comprising a second wall extending backward from the front face, the first and second walls cooperating to define an annular cavity and a center cavity; (d) at least one lens attached to the second wall and disposed in the center cavity; (e) one or more light emitting devices disposed in the annular cavity and operatively connected to the housing; and (f) at least one imaging device disposed in the cavity operatively connected to the housing and optically coupled to the lens.

DETAILED DESCRIPTION

Figure 1:
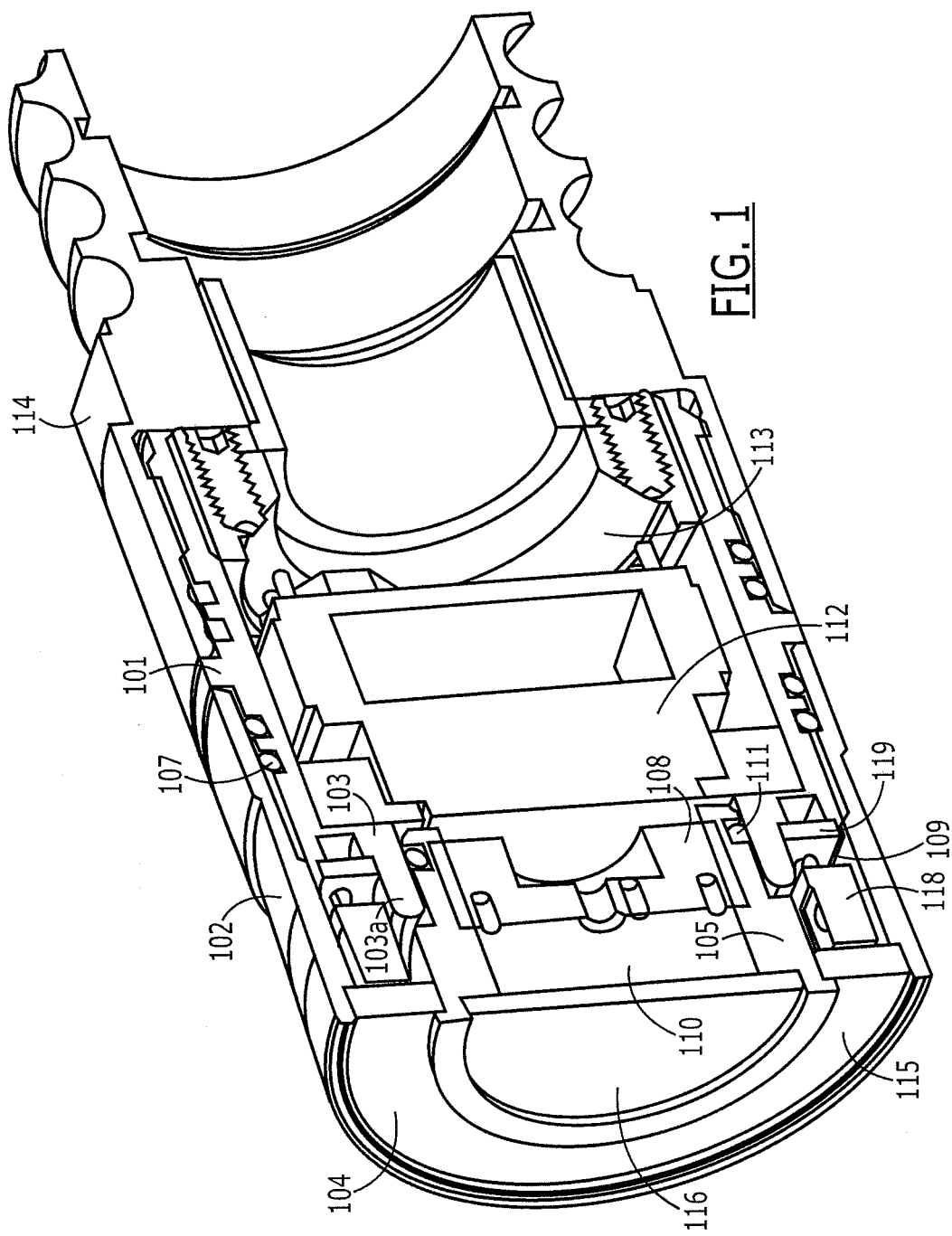
FIG. 1 shows a perspective side view of one embodiment of the camera head of the present invention.

Referring to FIGS. 1-4, one embodiment of the camera head 100 of the present invention is shown. Camera head 100 comprises: (a) a housing 101 having a front and back orientation, and defining a cavity 113, the housing being cylindrical, the housing 101 having a rear portion 114 for interengaging with a support system (not shown); (b) a first wall 103 annularly configured in the housing 101; (c) a front portion 102 in threaded engagement with an outer surface 120 of the housing 101 such that rotating the front portion 102 causes it to move axially with respect to the housing 101, the front portion 102 having a front face 104 at least a portion of which is transparent, the front portion 102 comprising a second wall 105 extending backward from the front face 104, the first and second walls 103, 105 cooperating to define an annular cavity 109 and a center cavity 110; (d) at least one lens 108 attached to the second wall 105 and disposed in the center cavity 110; (e) one or more light emitting devices 118 disposed in the annular cavity 109 and operatively connected to the housing 101; and (f) at least one imaging device 112 disposed in the cavity 113 operatively connected to the housing 101 and optically coupled to the lens 108.

Each of these elements is considered in greater detail below and with respect to some alternative embodiments. It should be understood, however, that the classification of the system in these discrete elements is for illustrative purposes and should not be construed to limit the scope of the invention. For example, it is anticipated that two or more elements may be correspond to a single component or the functionality of one element may correspond to two more components. Additionally, while the camera head is considered in detail with respect to a pipe inspection systems, application of the invention is not limited to such.

The housing 101 serves to cooperate with the front portion 102 to encase and protect the internal components. Moreover, the housing 101 serves as a substrate upon which the light emitting devices 118 and imaging device 112 connect, either directly or indirectly. This way, the front portion 102 may be moved independent of the light emitting devices 118 and imaging device 112.

The housing 101 also serves to interface with a variety of different support systems. For example, as shown in FIG. 1, the housing 101 comprises a back portion 114, which in this embodiment is an adapter for a push camera flexible spring connection. The support system functions to provide the electrical interconnections necessary to both power the light emitting devices 118 and imaging device 112, and to receive imaging signals from the imaging device. Such electrical interconnections are well known in the art. Additionally, the support system functions to provide mechanical support to hold the camera head. Again, such support systems are well known and may include, for example, wand devices, push cameras (e.g., See-snake, Pilit, SnakeEye III, Vi-Vax, and Verisight), and robotic arms. If the camera head needs to be adapted for connection to a different support system, the back portion 114 would simply be replaced with the appropriate adapter. Such adapters are well known and governed by industry standards and thus will not be considered herein in detail. Also in this respect, for simplicity, the electronic interconnects for the imaging device 112 and the light emitting devices 118 are not shown in detail, as such interconnects are well known in the art and require no additional explanation herein.

Attached to the housing 101 or integrally molded therewith is a first wall 103 which, in this embodiment, extends radially inward from the housing 101 to define an annular wall. As mentioned above, the purpose of the first wall is to cooperate with the second wall to define an annular cavity 109 and a center cavity 110. Additionally, the first and second walls are configured to segregate the annular cavity from the center cavity. To this end, the first wall 103 comprises a forward extending portion 103a. In this embodiment, the forward extending portion 103a comprises an interior cylindrical surface against which the second wall 105 forms a seal as it moves along the interior cylindrical surface as the front portion 102 is rotated. The first wall 103 also comprises a seat 106 (see FIG. 2) for receiving a light board 119 upon which the light emitting devices 118 are mounted (described in greater detail below). The wall 103 also comprises a passage (not shown) to facilitate electrical connection with the light emitting devices 118.

Figure 2:
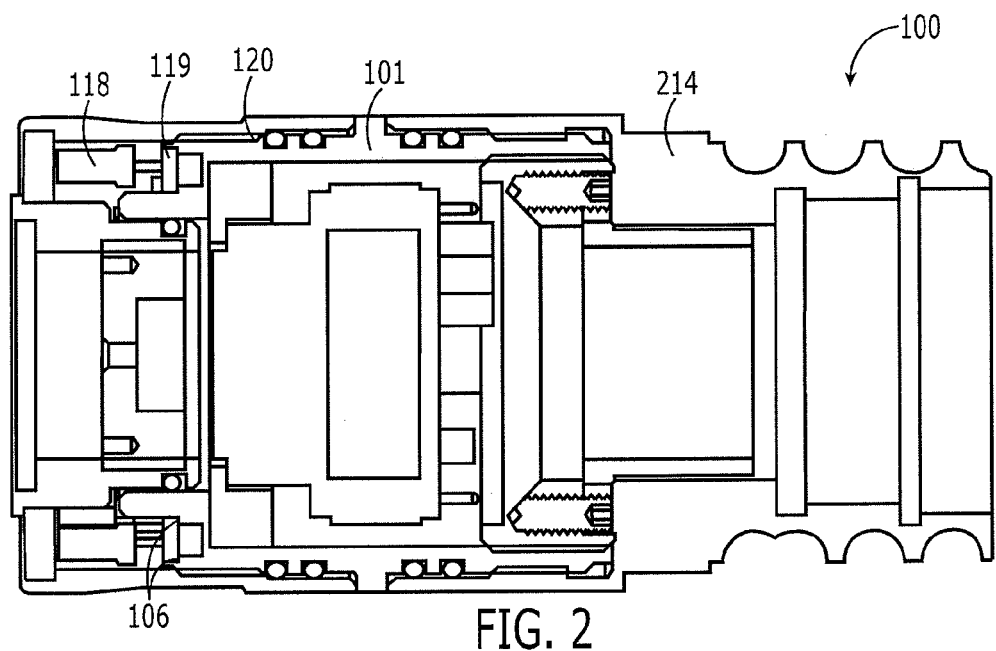
FIG. 2 shows a cross sectional, side view of the connector of the camera head of FIG. 1.

The front portion 102 functions to enclose the front end of the housing 101 and also to facilitate relative axial movement with respect to the housing 101. Specifically, the front portion 102 is interengaged with the housing 101 by means of threads 120 as shown in FIG. 2, or other camming means such that rotation of the front portion 102 causes its relative axial movement with respect to the housing 101. (Such mechanical interconnections are well known.) This is important because the lens 108 is connected to the front portion 102 such that any axial movement of the front portion 102 will necessarily cause axial movement of the lens 108 relative to the imaging device 112 contained in the housing 101, and thus provide lens adjustment.

Figure 3:
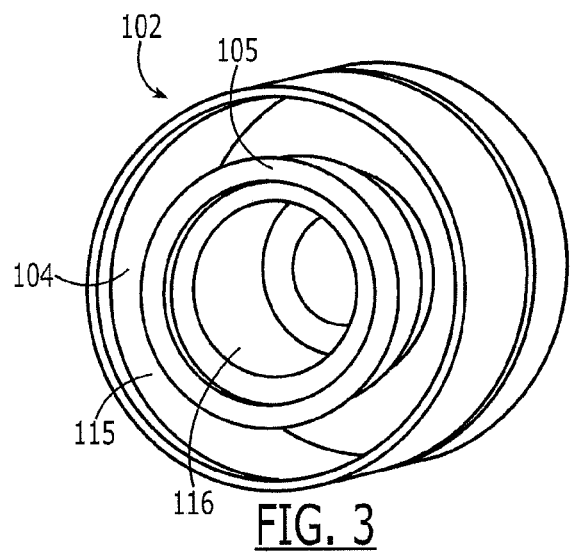
FIG. 3 shows a perspective view of the front portion of the camera head of FIG. 1.
Figure 4:
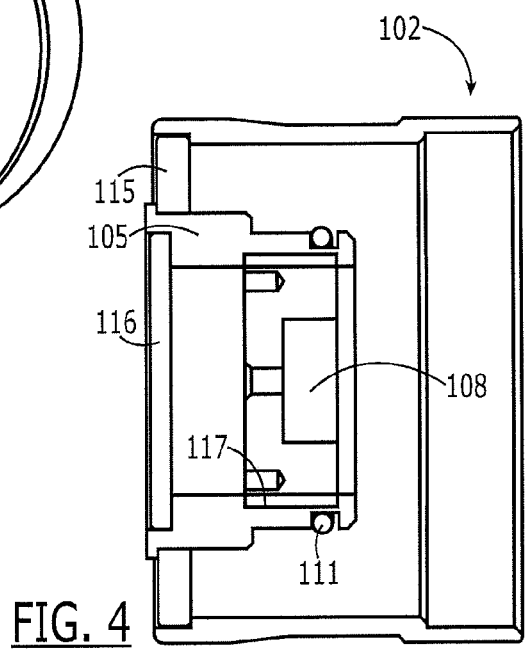
FIG. 4 shows a cross sectional, side view of the front portion of FIG. 3.

Referring to FIGS. 3 and 4, the front portion 102 is shown in a perspective and side cross section view, respectively. The front portion comprises a front face 104 at least a portion of which is transparent. Specifically, referring to the embodiment of FIGS. 3 and 4, the front face 104 comprises two transparent components. In this particular embodiment, it comprises an annular window 115 which serves to enclose the annular cavity 109 (see FIG. 1), and a center window 116 which serves to enclose the center cavity 110 (see FIG. 1). It should be noted that annular window 115 serves not only to enclose the annular cavity 109, but also to hold the second wall 105 and the center window 116 in place. In other words, the first wall and thus the lens which is attached to it are supported by the annular window 115. Accordingly, the annular window 115 should comprise a material of sufficient strength and size to provide a rigid and robust support for the second wall 105 and the lens contained therein. Although annular window 115 serves to position and hold the second wall 105 and lens 108 it should also be understood that, in this particular embodiment, the interaction between the first wall 103 and the second wall 105 also serves to provide additional support for the lens assembly contained therein. Specifically, the forwarding extending portion 103a encircles the second wall 105 to provide additional support.

As shown in FIGS. 1-4, the second wall 105 extends rearwardly from the front face 104. As mentioned above, the second wall 105 cooperates with the first wall 103 to define the annular and center cavities 109, 110. The interior portion 117 of the second wall 105 may be threaded in one embodiment to receive and hold a like-threaded lens 108. Such an embodiment has been found to facilitate easy substitution of one lens assembly for another. Additionally, the threaded interengagement of the lens 108 and the second wall 105 serve to strengthen the front portion, especially when disposed in the first wall 103.

The lens 108 functions to focus the light as is well known in the art. As mentioned above, because the lens 108 is attached to the front portion 102, any movement of the front portion necessarily causes the movement of the lens package relative to the imaging device 112 contained in the housing 101.

In one embodiment, the interfaces between various components are sealed. For example, to ensure that the interface between the housing 101 and the front portion 102 is waterproof, one or more seals 107 (in this case, O-rings) may be disposed there. Likewise, seals and/or labyrinths may be used to ensure that light emanating from the light emitting devices in the annular cavity 109 is prevented from entering the center cavity 110. In this particular embodiment, a seal 111 in the form of an O-ring is used to provide light isolation between the two cavities. Although a seal is used, it should be understood that other means of providing isolation may be used, including, for example, a labyrinth or a slight interference fit between the first and second walls.

In addition to making the housing waterproof and/or providing light insulation, the seals used in the present invention also serve to impart friction between the front portion 102 and the housing 101, thereby resisting their relative rotation. Such friction is desirable as it serves to prevent the front portion 102 from rotating relative to the housing 101 unless done so intentionally by the user.

The light emitting devices 118 function to illuminate the field of view. Such lights are well known in the art, and include, for example, light emitting diodes (LEDs), organic light emanating diodes (OLEDs), gas discharge tubes, filament-type lights, high intensity discharge (HID) lamps, and any other known devices for emitting light. In one embodiment, the light emitting devices are LEDs. LEDs are desirable because of their relatively high light output and low energy consumption. Because the annular cavity 109 in one embodiment is sealed from the center cavity 110 which houses the light imaging device, exceptionally bright LEDs with wide angles of diffusion may be used. By way of background, using exceptionally bright LEDs or those with a wide angle of diffusion was generally discouraged in camera heads as the light would often interfere with the imaging device 112. However, in the present invention in which the center cavity is isolated from the annular cavity, such bright or wide angle diffusion lamps can now be used. In one embodiment, LEDs having asymmetrical angles of diffusion are used. Specifically, in this embodiment, the LED has x and y axes, with broader light diffusion along the x axis compared to that long the y axis. (It should be understood that the use of the x and y axis herein is arbitrary). In such an embodiment, it is beneficial to align the y axis radially in the annular cavity to maximize the light output of the LEDs.

In one embodiment, the light emitting devices are mounted on a light board 119 such that the light board is a discrete component. In such an embodiment, it may be beneficial to use light emitting devices of different magnitudes and configurations. For example, it may be useful to use light emitting devices having certain light diffusion along the horizontal sides, and others with different light diffusion along the top. The configuration of light emitting devices on the light board 119 will be obvious to someone of skill in the art in light of this disclosure. As mentioned above, the light board is configured to seat on seat 19 in the embodiment shown in FIG. 1.

The imaging device 112 functions to generate and transmit an electrical signal corresponding to an area being imaged, herein referred to as the "image signal." The imaging device 112 may be any conventional or subsequently-developed device for imaging a target object. The term "imaging" broadly refers to a characterization or representation of the target object based on a particular property, such as, for example, its tendency to reflect or absorb electromagnetic radiation, its thermal profile, or its acoustical profile. Devices for imaging these characteristics or properties are known and include, for example, video cameras, still cameras, digital cameras, infrared detectors, X-ray machines, lasers, microphones, sonic or ultrasonic transducers, radar, and the like. In one embodiment, the imaging device 112 provides a video image of the target area. For example, the imaging device may comprise a charge coupled device (CCD) or complementary metal oxide semiconductor (CMOS). Such imaging devices are well known and thus there is no need to discuss them herein in detail. As mentioned above, the imaging devices are housed in a cavity 113 of the imaging head 100.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A camera head comprising:
   housing having a front and back orientation and defining a cavity, said housing being cylindrical and having an axis, said housing having a rear portion for interengaging with a support system;
   a first wall annularly configured in said housing;
   a front portion in threaded engagement with said housing such that rotating said front portion causes it to move axially with respect to said housing, said front portion having a front face at least a portion of which is transparent, said front portion comprising a second wall being cylindrical and extending backward from said front face to define a center cavity, said first and second walls cooperating to define an annular cavity between said front portion and said housing;
   at least one lens attached to said second wall and disposed in said center cavity;
   one or more light emitting devices disposed in said annular cavity and operatively connected to said housing; and
   at least one imaging device disposed in said cavity operatively connected to said housing and optically coupled to said lens; and
   wherein when said front portion is rotated relative to said housing, said lens moves with said front portion while said light emitting device remain stationary with respect to said housing.

2. The camera head of claim 1, further comprising at least a first seal between said housing said and front portion to prevent water front entering between said front portion and said housing and to provide frictional resistance in rotating said front portion relative to said housing.

3. The camera head of claim 1, further comprising at least a second seal between said first and second walls to prevent light from entering said center cavity from said annular cavity and to provide frictional resistance in rotating said front portion relative to said housing.

4. The camera head of claim 1, wherein said front face comprises an annular window, and a center window, wherein said second wall is disposed between said annular and center windows 5. The camera head of claim 1, wherein an inside portion of said second wall is threaded and said lens is held in said center cavity by threaded engagement with said inside portion.

6. The camera head of claim 1, wherein said first wall comprises a forward-extending portion to define an interior surface relative to which said second wall moves when said front portion is rotated.

7. The camera head of claim 6, wherein said forward extending portion and said first wall form a seal to prevent light from entering said center cavity from said annular cavity.

8. The camera head of claim 1, further comprising a light board on which said light emitting devices are mounted.

9. The camera head of claim 8, wherein said first wall comprises a forward-extending annular seat on which said light board is seated.

10. The camera head of claim 8, wherein said light board comprises two or more different types of light emitting devices.

11. The camera head of claim 8, wherein at least a portion of said light emitting devices have x,y axis and asymmetrical light diffusion, wherein said diffusion is greater along said x axis than said y axis, wherein the y axis of each light emitting device is aligned radially on said light board.

12. The camera head of claim 1, wherein said front portion is in threaded engagement with an outer surface of said housing.

* * * * *